(12) United States Patent
Mikkelsen et al.

(10) Patent No.: US 8,503,046 B2
(45) Date of Patent: Aug. 6, 2013

(54) ROTATING PRISM SCANNING DEVICE AND METHOD FOR SCANNING

(75) Inventors: Torben Krogh Mikkelsen, Humlebaek (DK); Jakob Mann Sorensen, Frederiksborg (DK); Morten Nielsen, Roskilde (DK)

(73) Assignee: Danmarks Tekniske Universitet, Lyngby (DK)

( * ) Notice: Subject to any disclaimer, the term of this patent is extended or adjusted under 35 U.S.C. 154(b) by 41 days.

(21) Appl. No.: 13/001,165

(22) PCT Filed: Jun. 26, 2009

(86) PCT No.: PCT/DK2009/000158
§ 371 (c)(1),
(2), (4) Date: Feb. 19, 2011

(87) PCT Pub. No.: WO2009/155924
PCT Pub. Date: Dec. 30, 2009

(65) Prior Publication Data
US 2012/0105923 A1    May 3, 2012

Related U.S. Application Data

(60) Provisional application No. 61/077,564, filed on Jul. 2, 2008.

(30) Foreign Application Priority Data

Jun. 27, 2008    (DK) ................................ 2008 00897

(51) Int. Cl.
H04N 1/04    (2006.01)
(52) U.S. Cl.
USPC ............ 358/475; 358/474; 358/496; 358/498
(58) Field of Classification Search
USPC .......................... 358/475, 474, 496, 498, 481
See application file for complete search history.

(56) References Cited

U.S. PATENT DOCUMENTS

| | | | |
|---|---|---|---|
| 3,425,768 A | 2/1969 | Kuhn et al. | |
| 4,061,415 A | 12/1977 | Taenzer | |
| 4,822,974 A | 4/1989 | Leighton | |
| 7,123,389 B2 * | 10/2006 | Yui | 358/496 |
| 8,169,671 B2 * | 5/2012 | Itoh et al. | 358/474 |
| 2007/0070480 A1 | 3/2007 | Mahajan et al. | |

* cited by examiner

*Primary Examiner* — Houshang Safaipour
(74) *Attorney, Agent, or Firm* — Polsinelli PC; Teddy C. Scott, Jr.; Ron Galant (57) ABSTRACT

The present invention relates to a scanning device and a method for scanning. The scanning device comprises a first frame (4) supporting a first deflector (6), and a second frame (8) supporting a second deflector (10). The first frame is arranged for rotation around a first axis (12), and the second frame is arranged for rotation around a second axis (14). The first frame is rotatably connected to a base (38) for rotation around the first axis and the second frame is arranged for rotation around the first axis. The method for scanning comprises rotating the first frame around the first axis according to a first selected value, and rotating the second frame around the second axis according to a second selected value.

20 Claims, 7 Drawing Sheets

ROTATING PRISM SCANNING DEVICE AND METHOD FOR SCANNING

CROSS-REFERENCE TO RELATED APPLICATIONS

This is the national stage of International Application No. PCT/DK2009/000158, filed on Jun. 26, 2009, which claims the benefit of U.S. Provisional Application Ser. No. 61/077,564, filed on Jul. 2, 2008, and also claims the benefit of Denmark Patent Application No. PA 2008 00897, filed on Jun. 27, 2008, the contents of all of which are incorporated herein by reference.

The present invention relates to the field of scanning devices, in particular optical scanning devices. More specifically, the present invention relates to a technique and a device for setting up a path, such as an optical path, in a desired direction.

Many applications require a scanner, such as an optical scanner, capable of steering a light beam in a desired direction. Many applications furthermore require a beam, such as a laser beam, to be aimed and focussed at a distant target. For instance, in some LIDAR-systems (Light Detection and Ranging-systems), a focused laser-beam is scanning an area in the space in front of the LIDAR-system.

It is known to use a pair of so-called Risley prisms (may also be known as dual prism or dual wedge scanners) for scanning a collimated light beam across a substantially two-dimensional (spherical) plane in front of the pair of Risley prisms. A pair of Risley prisms comprises two prisms having a common axis of rotation around which axis each of the two prisms can be rotated independently, whereby the beam may be positioned in a desired position within a substantially two-dimensional (spherical) plane.

U.S. Pat. No. 4,061,415 discloses a radiation deflecting system comprising a second wedge mounted for rotation about a fixed axis and a first wedge mounted for rotation about an axis which nutates about the fixed axis of rotation. The two wedges are counterrotating and have the same rate of rotation, thereby achieving a linear scanning motion.

It is an object of the present invention to provide an improved scanning device, an improved scanning system and an improved method for scanning. In particular, it is an object of the present invention to provide an improved device, an improved system and an improved method for setting up an optical path in a desired direction, e.g. towards a point on a substantially two-dimensional (spherical) plane. More in particular, it is an object of the present invention to provide an improved device, an improved system and an improved method for steering or controlling a focused light beam across a substantially two-dimensional (spherical) plane.

According to the present invention, the above-mentioned and other objects are fulfilled by a device comprising a first frame supporting a first deflector. The first deflector has a first surface and a second surface. The first surface and the second surface form a first deflector angle. The first frame is arranged for rotation around a first axis, which first axis forms a first surface angle with the first surface.

The device furthermore comprises a second frame supporting a second deflector. The second deflector has a third surface and a fourth surface. The third surface and the fourth surface form a second deflector angle. The second frame is arranged for rotation around a second axis, which second axis forms a frame angle with the first axis, forms a second surface angle with the second surface, and forms a third surface angle with the third surface.

The first frame is rotatably connected to a base for rotation of the first frame around the first axis. The second frame is furthermore arranged for rotation around the first axis.

The device further comprises a first drive coupled to the first frame for controlling the rotation of the first frame around the first axis, and a second drive coupled to the second frame for controlling the rotation of the second frame around the second axis, such that individual control of the rotation of the first frame around the first axis and the rotation of the second frame around the second axis is provided.

Providing the first deflector and the second deflector in the device as described above, may enable a diminished distortion in particularly of focused light. Furthermore, providing individual control of the rotation of the first frame around the first axis and the rotation of the second frame around the second axis enables that an optical path may be set to point in a desired direction, preferably within a substantially two-dimensional (spherical) plane.

According to the present invention, the above-mentioned and other objects are fulfilled by a method for scanning. The method comprises providing a scanning device. The scanning device comprises a first frame supporting a first deflector. The first frame is arranged for rotation around a first axis. The device furthermore comprises a second frame supporting a second deflector. The second frame is arranged for rotation around a second axis forming a frame angle with the first axis. The method for scanning further comprises a step of selecting a first value, and rotating the first frame around the first axis accordingly. Preferably, the method furthermore comprises a step of selecting a second value, and rotating the second frame around the second axis accordingly.

Provision of a method wherein the first value, e.g. an angle value and/or an angular velocity and/or angular acceleration, and the second value, e.g. an angle value and/or an angular velocity and/or angular acceleration, is selected may enable selection of a desired optical path and/or selection of a desired scanning pattern.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out. Throughout, the same reference numerals are used for identical or corresponding parts.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

DETAILED DESCRIPTION

The present invention relates to a scanning device, a scanning system, and a method for scanning.

The scanning device according to the present invention is preferably adapted for setting up an optical path and/or steering or controlling the direction of an optical path. An optical path is a path that light may follow for instance during propagation towards and/or away from the scanning device. Light may be infrared, visible, and/or ultraviolet light. Preferably, the optical path comprises a first optical path part extending from the first surface and away from the first deflector. The first optical path part may form a first optical angle with the first surface. Preferably, the optical path comprises a second optical path part extending between the second surface and the third surface. The second optical path part may form a second optical angle with the second surface and a third optical angle with the third surface, respectively. Preferably, the optical path comprises a third optical path part extending from the fourth surface and away from the second deflector. The third optical path part may form a fourth optical angle with the fourth surface.

Preferably, the optical path furthermore comprises a fourth optical path part extending between the first surface and the second surface. Preferably, the fourth optical path part abuts the first surface such that the first optical path part and the fourth optical path part form a continuous path. Furthermore, the fourth optical path part preferably abuts the second surface such that the second optical path part and the fourth optical path part form a continuous path.

Preferably, the optical path furthermore comprises a fifth optical path part extending between the third surface and the fourth surface. Preferably, the fifth optical path part abuts the fourth surface such that the third optical path part and the fifth optical path part form a continuous path. Furthermore, the fifth optical path part preferably abuts the third surface such that the second optical path part and the fifth optical path part form a continuous path.

The first optical path part, the second optical path part, the third optical path part, the fourth optical path part, and the fifth optical path part may form a continuous path.

In a preferred embodiment of a device according to the present invention, the first optical angle and the second optical angle are substantially equal. Distortion of a focussed light beam that goes through a deflector, e.g. the first deflector and/or the second deflector, is diminished if the angle of incidence of the incident part of the light beam is substantially equal to the angle of departure of the corresponding departing part of the light beam, i.e. if the light beam pass through the deflector at the angle of minimum deviation for the relevant deflector. In a preferred embodiment of a device according to the present invention, the third optical angle and the forth optical angle are substantially equal. In a preferred embodiment of a device according to the present invention, the first optical angle and the second optical angle are substantially equal; while also the third optical angle and the forth optical angle are substantially equal. Thus, minimum deflection within both the first deflector and the second deflector are obtained simultaneously. A minimum deflection is in particular an advantage if an embodiment is intended to be used for steering or controlling a finite focussed laser beam, due to a diminished distortion of the focus.

In a preferred embodiment, the first optical path part is substantially parallel with the first axis. Preferably, the first optical path coincides with a part of the first axis. In a preferred embodiment, the second optical path part is substantially parallel with the second axis. Preferably, the second optical path coincides with a part of the second axis.

The first surface angle of the scanning device according to the present invention may be given by approximately $$90° - \arcsin(n_1 \cdot \sin(\tfrac{\alpha_1}{2})),$$

where $n_1$ is the refractive index of the first deflector, and $\alpha_1$ is the first deflector angle. Note that a refractive index is frequency dependent, thus the preferred first surface angle may also depend on the relevant wavelength or range of wavelength. However, a deflector, such as the first deflector and/or the second deflector, may comprise a coating for at least partly to diminish the wavelength dependency in at least one range of wavelengths. The first surface angle of the scanning device according to the present invention may be between about 50° to about 85°, such as between about 60° to about 80°, preferably about 67°.

The second surface angle of the scanning device according to the present invention may be given by approximately $$90° - \arcsin(n_1 \cdot \sin(\tfrac{\alpha_1}{2})),$$

where $n_1$ is the refractive index of the first deflector, and $\alpha_1$ is the first deflector angle. The second surface angle may be between about 50° to about 85°, such as between about 60° to about 80°, preferably about 67°. The first surface angle and the second surface angle are preferably substantially equal.

The third surface angle may be given by approximately $$90° - \arcsin(n_2 \cdot \sin(\tfrac{\alpha_2}{2})),$$

where $n_2$ is the refractive index of the second deflector, and $\alpha_2$ is the second deflector angle. The second surface angle may be substantially equal to the third surface angle.

The frame angle may be given by approximately $$2 \cdot \arcsin(n_1 \cdot \sin(\tfrac{\alpha_1}{2})) - \alpha_1,$$

where $n_1$ is the refractive index of the first deflector, and $\alpha_1$ is the first deflector angle. The frame angle may have any value above 1°, such as between about 1° to about 60°, such as between about 20° to about 40°, preferably about 31°. In some embodiments the, frame angle is between about 5° to about 35°, preferably about 15°.

Preferably, the frame angle is less than 45°, more preferably less than 42°, even more preferably less than 40°, still more preferably less than 35°. For some embodiments, it may be an advantage that the frame angle is less than 30°, such as less than 25°, 20°, 15°, 10°, or 5°. A small frame angle may facilitate rotation of the frames during operation of the device or system according to the present invention.

Preferably, the frame angle is larger than 5°, such as larger than 10°, 15°, 20°, 25°, or 30°. A larger frame angle may enable that a larger area may be scanned. Thus, a preferred frame angle may be a compromise between the above-mentioned aspects of facilitating rotation and enabling a desired area for scanning.

For some embodiments, it may be an advantage that the frame angle is larger than 45°, such as larger than 50°, 60°, or 80°. The frame angle may for instance be approximately 90°. A large frame angle may in particular be an advantage if it is desired to view a large area, such as an area larger than a hemisphere. A large frame angle may for instance be an advantage if the device or system according to the present invention is used in combination with a camera.

Preferably, the first surface angle equals the first optical angle. Preferably, the second surface angle equals the second optical angle. Preferably, the third surface angle equals the third optical angle.

In a preferred embodiment of a device according to the present invention, the first deflector is arranged for deflecting a light beam being substantially parallel with the first axis of rotation and being incident on the first surface, such that the deflected light beam departs from the second surface in a direction being substantially parallel with the second axis of rotation.

In a preferred embodiment of a device according to the present invention, the first deflector is arranged for deflecting a light beam being substantially parallel with the second axis of rotation and being incident on the second surface, such that the deflected light beam departs from the first surface in a direction being substantially parallel with the first axis of rotation.

The second frame of the scanning device according to the present invention is preferably rotatably connected to the first frame such that rotation of the second frame around the second axis is provided. The second frame of the scanning device according to the present invention may be coupled to the first frame, such that the rotation of the first frame around the first axis may influence the rotation of the second frame around the first axis. An arrangement for rotation of a frame, e.g. the first frame or the second frame, may for instance be provided by one or more bearings, such as ball bearings or roller bearings. The rotation of the first frame around the first axis may affect the rotation of the second frame around the second axis, e.g. by a constant factor.

The scanning device according to the present invention may comprise a control device connected to the first drive and the second drive via at least one control connection, whereby the control device is arranged for controlling the first drive and the second drive, individually. A specific orientation of the third optical path part may be obtained by means of the control device.

A scanning system according to the present invention may comprise the scanning device according to the present invention and at least one optical device. The at least one optical device may comprise a light detector adapted to detect light from the first surface. The at least one optical device may, alternatively or additionally, comprise a light source adapted to emit a light beam towards the first surface. Preferably, the light source comprises a laser. The at least one optical device may furthermore comprise a focusing element. Preferably, the light beam emitted by the light source (or from the optical device) is a finite focused laser beam. The scanning system according to the present invention may be used for steering or controlling the finite focused laser beam. In some embodiments, the at least one optical device comprises a LIDAR (Light Detection and Ranging).

Preferably, the optical device is adapted to emit the light beam towards the first surface and detect light arriving from the first surface substantially simultaneously. More specifically, light from the at least one optical device may be emitted through the scanning device according to the present invention and towards an object in front of the scanning device and reflected back through the scanning device.

A scanning device (or scanning system) according to the present invention may be used for steering or controlling the optical path. Steering or controlling the optical path may for instance comprise choosing a first angular position for the first frame and choosing a second angular position for the second frame. Alternatively or additionally, steering or controlling the optical path may include performing a scanning motion. A scanning motion may for instance be a particular coordinated rotation of the first frame around the first axis and/or the second frame around second axis, respectively, over time. The first value and/or the second value may be an angular position, an angular velocity (or speed), or an angular acceleration. In a preferred embodiment, a first angular velocity (or speed) and/or first angular acceleration is chosen for the first frame and a second angular velocity (or speed) and/or second angular acceleration is chosen for the second frame. For instance, the second frame may rotate with a slightly higher or lower angular velocity (or speed) and/or acceleration than the first frame. For example, the speed of rotation of one axis, e.g. the first, may be at least 1% (such as at least 5%, 10%, or 15%) higher or lower than the speed of rotation of another axis, e.g. the second. Alternatively, a chosen first value may be substantially equal to a chosen second value. In any case, however, the first frame may be adapted to rotate and/or accelerate in any direction, preferably irrespectively of a rotational and/or acceleration direction of the second frame. The second frame may be adapted to rotate and/or accelerate in any direction, preferably irrespectively of a rotational and/or acceleration direction of the first frame.

A device or a system according to the present invention may be placed at, on, or near a wind turbine or at or near a wind turbine park/farm.

A device or a system according to the present invention may be placed at, on, or near any wind dependent or wind sensitive device, system, building, etc.

Rotating the first axis and the second axis with constants speeds, that may be different, may in particular be an advantage for a device or system according to the present invention positioned on a wind turbine.

Preferred methods according to the present invention may comprise illuminating an area in front of the scanning system with the light beam from the light source such that at least a part of the light is reflected from the area, and detecting at least a part of the reflected light from the area using the light detector. Illuminating an area having a number of objects may lead to that at least a fraction of the light illuminating the objects is reflected back towards the scanning system and to the light detector.

A device or a system according to the present invention may be used for measuring or estimating wind speed, velocity of wind, wind direction, etc., or any combination of the mentioned. Such measurements or estimations may in particular be advantageous as an input for controlling a wind turbine or a wind turbine farm.

An embodiment of a scanning device according to the present invention may be used as a part of a camera system, such as a surveillance camera. The light detector of the system according to the present invention may be a camera.

A device or a system according to the present invention may comprise more than two frames and/or more than two deflectors.

Figure 1:
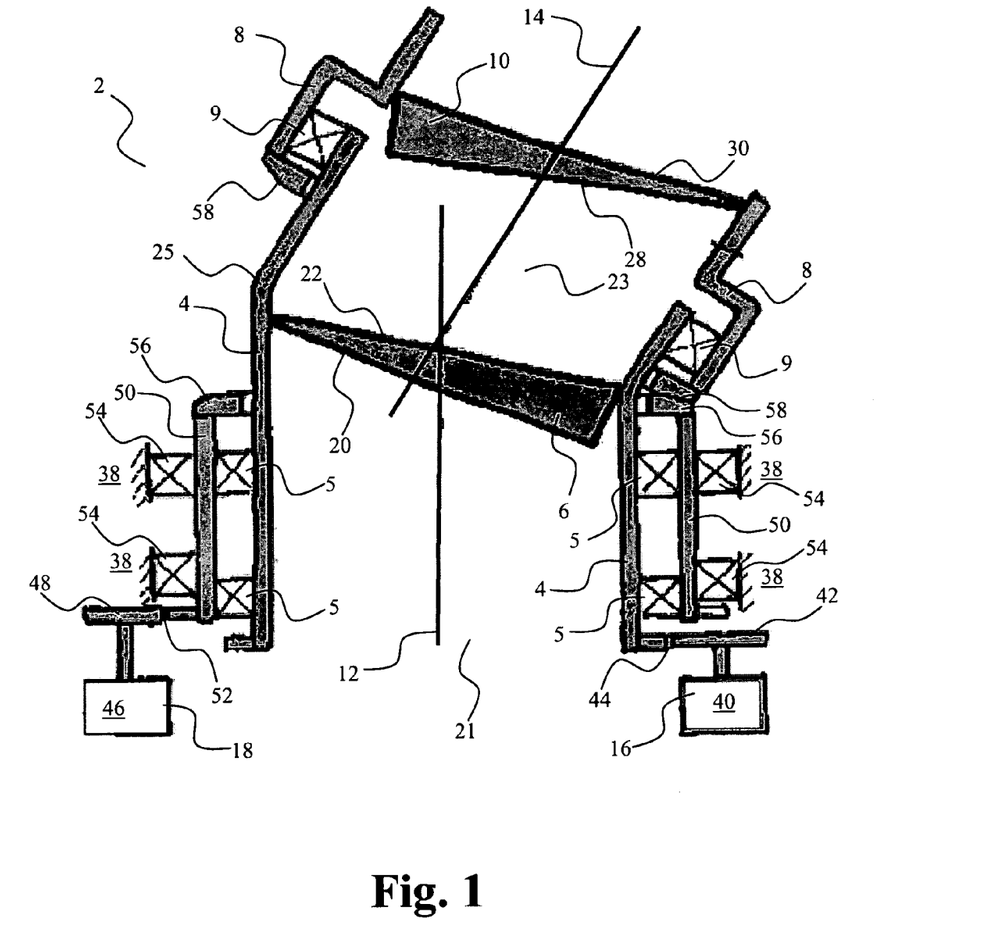
FIG. 1 schematically illustrates a cross section of a first embodiment of a device according to the present invention, FIG. 2 schematically illustrates a cross section of parts of the embodiment illustrated in FIG. 1, FIG. 3 schematically illustrates a cross section of parts of the embodiment illustrated in FIG. 1 and an optical device, FIG. 4 schematically illustrates a cross section of a second embodiment of a device according to the present invention, FIG. 5 schematically illustrates a cross section of a third embodiment of a device according to the present invention, FIG. 6 schematically illustrates three embodiments of a controller device connected to a first drive and a second drive, respectively, of a device according to the present invention, and FIG. 7 schematically illustrates an embodiment of a method for scanning according to the present invention.

FIG. 1 schematically illustrates a cross section of a first embodiment of a device 2 according to the present invention. The device 2 is adapted for setting up an optical path (see for instance the dotted line in FIG. 3), which optical path may be set to point in a desired direction, i.e. the device 2 is adapted for deflecting light towards and/or from a desired direction.

The device 2 comprises a first frame 4 supporting a first deflector 6. Furthermore, the device 2 comprises a second frame 8 supporting a second deflector 10. Additionally, a first axis 12 and a second axis 14 are illustrated by two lines, respectively.

Figure 2:
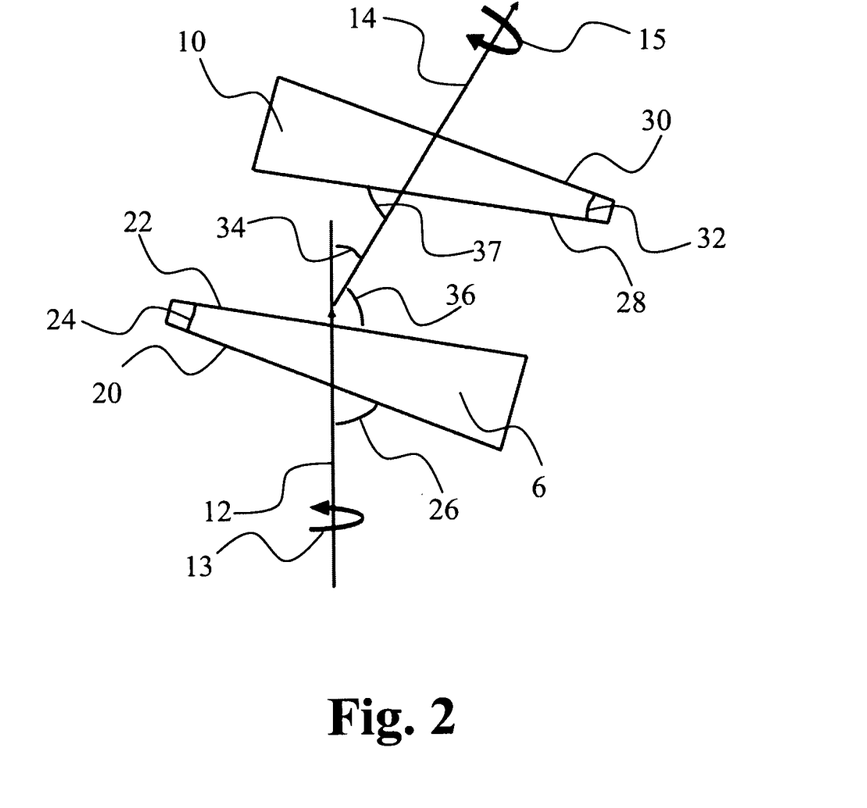

Some angles of interest are illustrated in more detail in FIG. 2 as explained in the following. FIG. 2 schematically illustrates a cross section of some parts of the embodiment illustrated in FIG. 1. The parts illustrated in FIG. 2 include the first deflector 6 and the second deflector 10 along with the first axis 12 and the second axis 14. Furthermore, FIG. 2 illustrates two arrows 13, 15, which indicate that the first axis 12 and the second axis 14, respectively, are axis of rotation. Although, the arrows 13, 15 only illustrate one direction of rotation each, any direction of rotation may be possible.

Preferably, the first deflector 6 is made of a material having a refractive index that is higher than the surroundings for wavelengths visible light and/or infra-red light and/or ultra-violet-light. The surroundings may be air. The first deflector 6, illustrated in FIG. 2, has the shape of a wedge-like member that is cut from a cylindrical member, e.g. a circular cylinder. In an embodiment, the first deflector 6 and/or the second deflector 10 has the shape of a cylindrical wedge. The first deflector 6 has a first surface 20 and a second surface 22. The first surface 20 and the second surface 22, respectively, are situated in planes perpendicular to the plane of the illustrated cross section. Preferably, the first surface 20 and the second surface 22 are non-parallel, i.e. they form a first deflector angle 24, such that light passing the first deflector 6 changes direction.

Likewise, the second deflector 10 preferably has the shape of a wedge-like member which is cut from a cylindrical member, e.g. a circular cylinder. The second deflector 10 has a third surface 28 and a fourth surface 30. The third surface 28 and the fourth surface 30, respectively, are situated in planes perpendicular to the plane of the illustrated cross section. It is important that the third surface 28 and the fourth surface 30 are non-parallel, i.e. that they form a second deflector angle 32, such that light passing the second deflector 10 changes direction. The second deflector 10 is made of a material having a refractive index that is higher than the surroundings for visible light and/or infra-red light and/or ultraviolet-light. The surroundings may be air. In the illustrated embodiment, the first deflector 6 and the second deflector 10 are substantially identical.

The first axis 12 forms a first surface angle 26 with the first surface 20, and a frame angle 34 with the second axis 14. Further, the second axis 14 forms a second surface angle 36 with the second surface 22, and a third surface angle 37 with the third surface 28. The angle between an axis and a surface is defined as the smallest angle.

The first frame 4, illustrated in FIG. 1, has a tubular-like shape enclosing the first deflector 6. The first frame 4 has a first opening 21 and a second opening 23, allowing light to pass to the first deflector 6 through any of the openings 21, 23 and from the first deflector 6 through any of the openings 21, 23. The illustrated first frame 4 forms an elbow-like bend 25. The part of the first frame 4 closest to the first opening 21 forms a tubular-like member having a centre around the first axis 12. Further, the part of the first frame 4 closest to the second opening 23 forms a tubular-like member having a centre around the second axis 14.

Furthermore, the first frame 4 is arranged for rotation around the first axis 12. The arrangement for rotation comprises a number of first bearing suspensions 5. Through the bearing suspensions 5, the first frame 4 is rotatably connected to a base 38. Due to the first frame 4 supporting the first deflector 6, a rotation of the first frame 4 around the first axis 12 causes an identical rotation of the first deflector 6 around the first axis 12. Thus, during a rotation of the first frame 4 around the first axis 12, the first surface angle 26 remains constant.

The second frame 8 is arranged for rotation around the second axis 14. The arrangement for rotation comprises a second bearing suspension 9, through which second bearing suspension 9 the second frame 8 is rotatably connected to the first frame 4. Consequently, the frame angle 34 and the second surface angle 36 will remain constant during a rotation of the first frame 4 around the first axis 12 and during a rotation of the second frame 8 around the second axis 14. Furthermore, a rotation of the first frame 4 around the first axis 12 will result in a rotation of the second frame 8 around the first axis 12 and therefore also a rotation of the second axis 14 around the first axis 12. During a complete revolution of the first frame 4 around the first axis 12, the second axis 14 will outline a cone having the first axis 12 as the centre.

Figure 3:
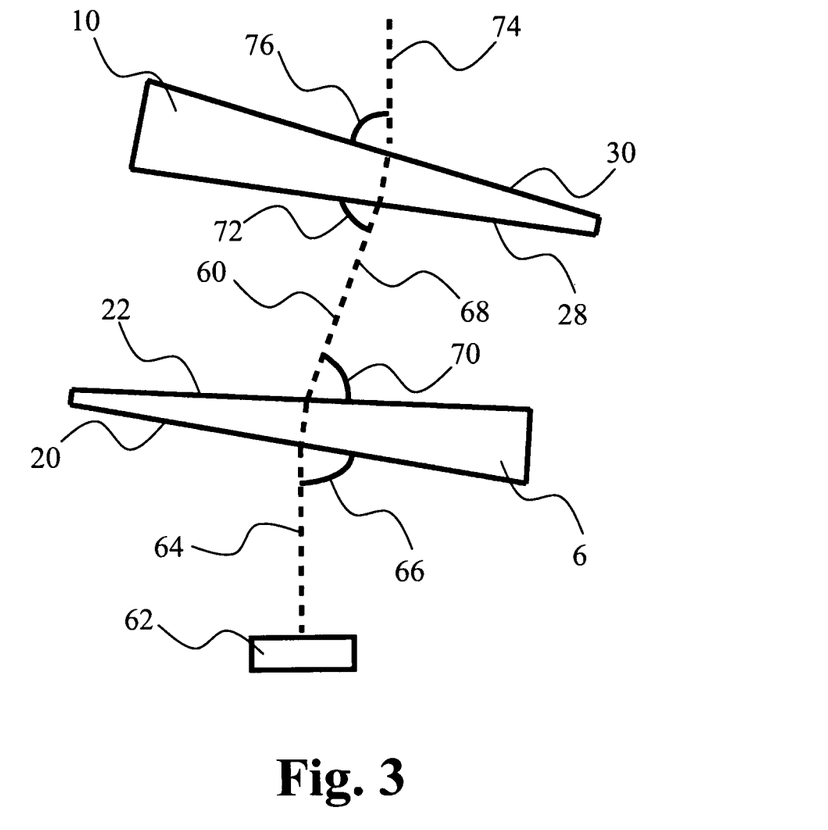

The device 2 is adapted for setting up an optical path. FIG. 3 illustrates an optical path 60 (the dotted line) set by the first deflector 6 and the second deflector 10. FIG. 3 furthermore illustrates an optical device 62, e.g. a device comprising an emitter and/or a detector. An embodiment of a scanning device, e.g. the device 2, and an optical device, e.g. the device 62, constitute an embodiment of a scanning system according the present invention. The optical path 60 comprises a first optical path part 64 extending from the first surface 20 and away from the first deflector 6. The first optical path part 64 forms a first optical angle 66 with the first surface 20. The angle between a path and a surface is defined as the smallest angle. The optical path 60 furthermore comprises a second optical path part 68 extending between the second surface 22 and the third surface 28. The second optical path part 68 forms a second optical angle 70 with the second surface 22 and forms a third optical angle 72 with the third surface 28, respectively. Furthermore, the optical path 60 comprises a third optical path part 74 extending from the fourth surface 30 and away from the second deflector 10. The third optical path part 74 forms a fourth optical angle 76 with the fourth surface 30. A point (not shown) on the third optical path part 74 at a desired distance from the device 2, is referred to as the aim of the optical path 60.

Advantageously, the first optical path part 64 is substantially parallel with the first axis 12 since it implies that the first optical angle 66 is constant during a rotation of the first deflector 6 around the first axis 12. Furthermore, it is preferred that the second optical path part 68 is substantially parallel with the second optical path 14 since it implies that the second optical angle 70 equals the second surface angle 36 and the third optical angle 72 equals the third surface angle 37. It may furthermore be an advantage that the first optical path part 64 substantially coincides with a part of the first axis 12 since it may diminish distortion of the optical path 60 during rotation of the first deflector 6. Likewise, it may be an advantage that the second optical path part 68 substantially coincides with a part of the second optical path 14 since it may diminish distortion of the optical path 60 during rotation of the first deflector 6 and/or the second deflector 10. Due to the deflector angles 24, 32 and the refractive index(es) of the deflectors 6, 10 being different from the surroundings, a desired optical path 60 is set by setting the rotational position of the deflectors accordingly.

In order to be adapted for rotating the deflectors 6, 10 individually, the device 2, illustrated in FIG. 1, comprises a number of actuating means as explained in the following. The device 2 comprises a first drive 16 coupled to the first frame 4. The first drive 16 is adapted for controlling the rotation of the first frame 4 around the first axis 12. The first drive 16 comprises a first motor 40 that is fixed to the base 38. The first motor 40 may drive a first wheel 42 which controls the rotation of the first frame 4 around the first axis 12 due to the gearing connection 44. Thus, Individual control of the rotation of the first frame 4 around the first axis 12 is provided by the first drive 16. Due to the connection between the first frame 4 and the second frame 8, the first drive 16 furthermore controls the rotation of the second frame 8 around the first axis 12.

Furthermore, the device 2 comprises a second drive 18 coupled to the second frame 8. The second drive 18 is adapted for controlling the rotation of the second frame 8 around the second axis 14. The second drive 18 comprises a second motor 46 which is fixed to the base 38. The second motor 46 may drive a second wheel 48 which controls the rotation of a coupling part 50 around the first axis 12 due to the gearing connection 52. The coupling part 50 is rotatably connected to the base 38 through bearings 54. The coupling part 50 is connected to the second frame 8 by means of a first wheel 56 and a second wheel 58. The first wheel 56 is a first angled gearwheel which is fixed to the coupling part 50. The second wheel 58 is a second angled gearwheel which is fixed to the second frame 8. Note that a rotation of the first frame 4 around the first axis 12 may affect, e.g. by a constant factor, the rotation of the second frame 8 around the second axis 14. However, a similar rotation of the coupling part 50 may cancel out that effect. Thus, individual control of the rotation of the second frame 8 around the second axis 14 is provided by the second drive 18. However, knowledge of the rotation of the first frame 4 around the first axis 12 may be an advantage.

Thus, by controlling the first drive 16 and the second drive 18, an optical path may be set in a desired direction and/or a desired scanning motion may be carried out.

In an embodiment (not illustrated), the second drive 18 is fixed to the first frame 4. Thus, the rotation of the first frame 4 around the first axis 12 may not influence the rotation of the second frame 8 around the second axis 14. Thus, individual control of the rotation of the second frame 8 around the second axis 14 is provided by the second drive 18.

Note that an aim (focus point) of the optical path 60 may correspond to more than one setting of the angular positions of the first frame 4 around the first axis 12 and the second frame 8 around the second axis 14, respectively. Thus, it may be an advantage to coordinate the rotational position of the first frame 4 and the second frame 8, respectively. Preferably, the coordination is carried out by a control device (see FIG. 6).

Figure 4:
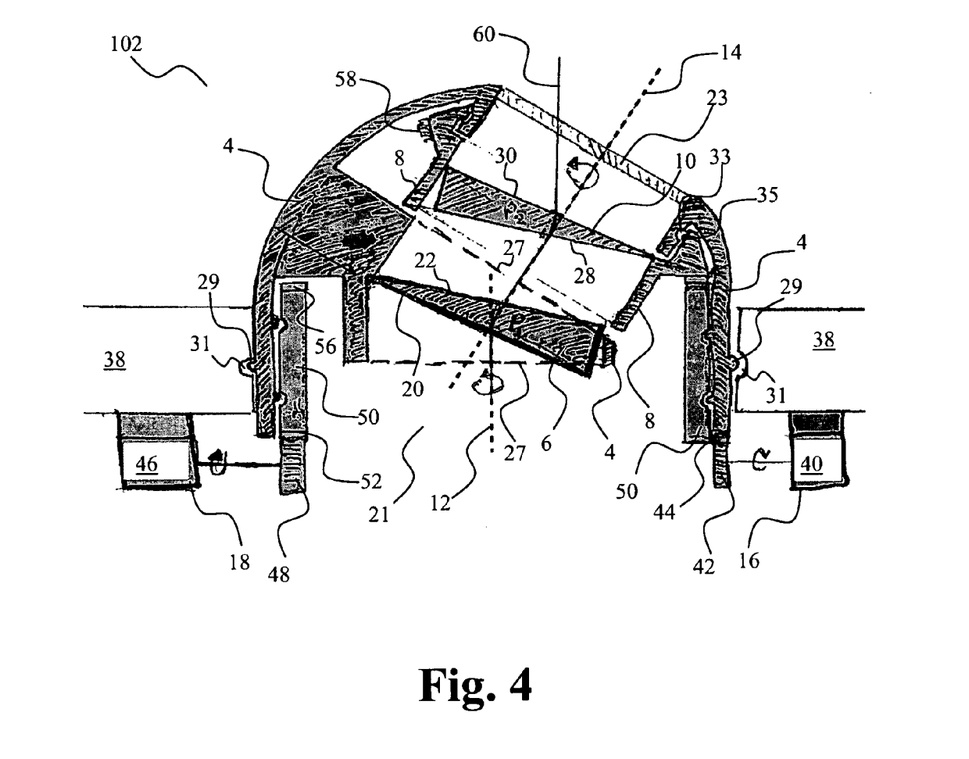

FIG. 4 schematically illustrates a cross section of a second embodiment of a device 102 according to the present invention. The device 102 is adapted for setting up an optical path (see for instance the dotted line in FIG. 3), which optical path may be set to point in a desired direction, i.e. the device 102 is adapted for deflecting light towards and/or from a desired direction.

The device 102 comprises a first frame 4 supporting a first deflector 6. Furthermore, the device 2 comprises a second frame 8 supporting a second deflector 10. Additionally, a first axis 12 and a second axis 14 are illustrated by two dotted lines, respectively. Some angles of interest are illustrated in more detail in FIG. 2 as explained above. FIG. 2 schematically illustrates a cross section of some parts of the embodiment illustrated in FIG. 4.

The first frame 4, illustrated in FIG. 4, encloses the first deflector 6. The dotted lines 27 indicate some parts of the first frame 4 situated above or below the plane of the cross section illustrated in FIG. 4. The first frame 4 has a first opening 21 and a second opening 23, allowing light to pass to the first deflector 6 through any of the openings 21, 23 and from the first deflector 6 through any of the openings 21, 23. A part of the first frame 4 closest to the first opening 21 forms a tubular-like member having a centre around the first axis 12. Further, a part of the first frame 4 closest to the second opening 23 forms a tubular-like member having a centre around the second axis 14. Further, part of the first frame 4 forms part of a sphere.

Furthermore, the first frame 4 is arranged for rotation around the first axis 12. The first frame 4 is rotatably connected to a base 38. The rotatable connection comprises a protrusion 29 in the first frame 4, which protrusion 29 fits into a corresponding recess 31 in the base 38. The rotatable connection provided by the protrusion 29 and the recess 31 enables rotation of the first frame 4 around the first axis 12 while substantially preventing displacement of the first frame 4 along the first axis 12 in relation to the base 38. Due to the first frame 4 supporting the first deflector 6, a rotation of the first frame 4 around the first axis 12 causes an identical rotation of the first deflector 6 around the first axis 12. Thus, during a rotation of the first frame 4 around the first axis 12, the first surface angle 26 remains constant.

The second frame 8 is arranged for rotation around the second axis 14. The second frame 8 is rotatably connected to the first frame 4. The rotatable connection comprises a recess 33 in the first frame 4, in which recess 33 a protrusion 35 in the second frame 8 fits. The rotatable connection provided by the recess 33 and the protrusion 35 enables rotation of the second frame 8 around the second axis 14, while substantially preventing displacement of the second frame 8 along the second axis 14, in relation to the first frame 4. Consequently, the frame angle 34 and the second surface angle 36 will remain constant during a rotation of the first frame 4 around the first axis 12 and during a rotation of the second frame 8 around the second axis 14. Furthermore, a rotation of the first frame 4 around the first axis 12 will result in a rotation of the second frame 8 around the first axis 12 and therefore also a rotation of the second axis 14 around the first axis 12. During a complete revolution of the first frame 4 around the first axis 12, the second axis 14 will outline a cone having the first axis 12 as the centre.

The device 102 is adapted for setting up an optical path. FIG. 3 illustrates an optical path 60 (the dotted line) set by the first deflector 6 and the second deflector 10. See the description of FIG. 3 above.

In order to be adapted for rotating the deflectors 6, 10 individually, the device 102, illustrated in FIG. 4, comprises a number of actuating means as explained in the following. The device 102 comprises a first drive 16 coupled to the first frame 4. The first drive 16 is adapted for controlling the rotation of the first frame 4 around the first axis 12. The first drive 16 comprises a first motor 40 that is fixed to the base 38. The first motor 40 may drive a first wheel 42 which controls the rotation of the first frame 4 around the first axis 12 due to the gearing connection 44. Thus, individual control of the rotation of the first frame 4 around the first axis 12 is provided by the first drive 16. Due to the connection between the first frame 4 and the second frame 8, the first drive 16 furthermore controls the rotation of the second frame 8 around the first axis 12.

Furthermore, the device 102 comprises a second drive 18 coupled to the second frame 8. The second drive 18 is adapted for controlling the rotation of the second frame 8 around the second axis 14. The second drive 18 comprises a second motor 46 which is fixed to the base 38. The second motor 46 may drive a second wheel 48 which controls the rotation of a coupling part 50 around the first axis 12 due to the gearing connection 52. The coupling part 50 is rotatably connected to the base 38 through the first frame 4. The coupling part 50 is connected to the second frame 8 by means of a first wheel 56 and a second wheel 58. The first wheel 56 is a first gearwheel which is fixed to the coupling part 50. The second wheel 58 is a second gearwheel which is fixed to the second frame 8. Note that a rotation of the first frame 4 around the first axis 12 may affect the rotation of the second frame 8 around the second axis 14. However, a similar rotation of the coupling part 50 may cancel out that effect. Thus, individual control of the rotation of the second frame 8 around the second axis 14 is provided by the second drive 18. However, knowledge of the rotation of the first frame 4 around the first axis 12 may be an advantage.

Thus, by controlling the first drive 16 and the second drive 18, an optical path may be set in a desired direction and/or a desired scanning motion may be carried out.

In an embodiment (not illustrated), the second drive 18 is fixed to the first frame 4. Thus, the rotation of the first frame 4 around the first axis 12 may not influence the rotation of the second frame 8 around the second axis 14. Thus, individual control of the rotation of the second frame 8 around the second axis 14 is provided by the second drive 18.

Note that an aim (focus point) of the optical path 60 may correspond to more than one setting of the angular positions of the first frame 4 around the first axis 12 and the second frame 8 around the second axis 14, respectively. Thus, it may be an advantage to coordinate the rotational position of the first frame 4 and the second frame 8, respectively. Preferably, the coordination is carried out by a control device (see FIG. 6).

Figure 5:
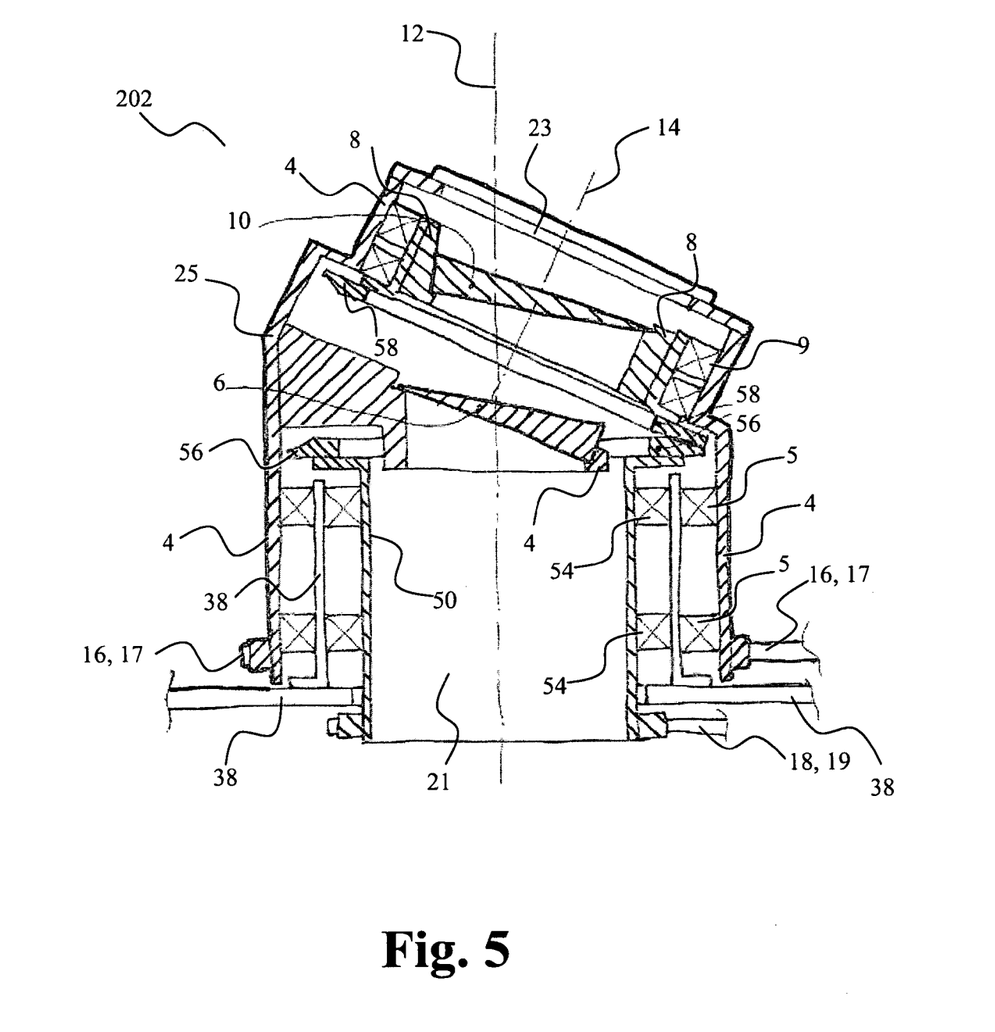

FIG. 5 schematically illustrates a cross section of a third embodiment of a device 202 according to the present invention. The device 202 is adapted for setting up an optical path (see for instance the dotted line in FIG. 3), which optical path may be set to point in a desired direction, i.e. the device 202 is adapted for deflecting light towards and/or from a desired direction.

The device 202 comprises a first frame 4 supporting a first deflector 6. Furthermore, the device 202 comprises a second frame 8 supporting a second deflector 10. Additionally, a first axis 12 and a second axis 14 are illustrated by two lines, respectively.

Some angles of interest are illustrated in more detail in FIG. 2 as explained in the following. FIG. 2 schematically illustrates a cross section of some parts of the embodiment illustrated in FIG. 5.

The first frame 4, illustrated in FIG. 5, encloses the first deflector 6. The first frame 4 has a first opening 21 and a second opening 23, allowing light to pass to the first deflector 6 through any of the openings 21, 23 and from the first deflector 6 through any of the openings 21, 23. The illustrated first frame 4 forms an elbow-like bend 25. The part of the first frame 4 closest to the first opening 21 forms a tubular-like member having a centre around the first axis 12. Further, the part of the first frame 4 closest to the second opening 23 forms a substantially tubular-like member having a centre around the second axis 14.

Furthermore, the first frame 4 is arranged for rotation around the first axis 12. The arrangement for rotation comprises a number of first bearing suspensions 5. Through the bearing suspensions 5, the first frame 4 is rotatably connected to a base 38. Due to the first frame 4 supporting the first deflector 6, a rotation of the first frame 4 around the first axis 12 causes an identical rotation of the first deflector 6 around the first axis 12. Thus, during a rotation of the first frame 4 around the first axis 12, the first surface angle 26 remains constant.

The second frame 8 is arranged for rotation around the second axis 14. The arrangement for rotation comprises a second bearing suspension 9, through which second bearing suspension 9 the second frame 8 is rotatably connected to the first frame 4. Consequently, the frame angle 34 and the second surface angle 36 will remain constant during a rotation of the first frame 4 around the first axis 12 and during a rotation of the second frame 8 around the second axis 14. Furthermore, a rotation of the first frame 4 around the first axis 12 will result in a rotation of the second frame 8 around the first axis 12 and therefore also a rotation of the second axis 14 around the first axis 12. During a complete revolution of the first frame 4 around the first axis 12, the second axis 14 will outline a cone having the first axis 12 as the centre.

The device 202 is adapted for setting up an optical path. FIG. 3 illustrates an optical path 60 (the dotted line) set by the first deflector 6 and the second deflector 10. See description of FIG. 3 above.

In order to be adapted for rotating the deflectors 6, 10 individually, the device 202, illustrated in FIG. 5, comprises a number of actuating means as explained in the following. The device 202 comprises a first drive 16 coupled to the first frame 4. The first drive 16 is adapted for controlling the rotation of the first frame 4 around the first axis 12. The first drive 16 comprises a first belt 17. The first belt 17 is included in the illustrated cross section for illustrative purposes. Preferably, the first drive 16 comprises a motor (not illustrated) for rotating the first belt 17. The first belt 17 controls the rotation of the first frame 4 around the first axis 12. Thus, individual control of the rotation of the first frame 4 around the first axis 12 is provided by the first drive 16. Due to the connection between the first frame 4 and the second frame 8, the first drive 16 furthermore controls the rotation of the second frame 8 around the first axis 12.

Furthermore, the device 202 comprises a second drive 18 coupled to the second frame 8. The second drive 18 is adapted for controlling the rotation of the second frame 8 around the second axis 14. The second drive 18 comprises a second belt 19. The second belt 19 is included in the illustrated cross section for illustrative purposes. Preferably, the second drive 18 comprises a motor (not illustrated) for rotating the second belt 19. The second belt 19 controls the rotation of a coupling part 50 around the first axis 12. The coupling part 50 is rotatably connected to the base 38 through bearings 54. The coupling part 50 is connected to the second frame 8 by means of a first wheel 56 and a second wheel 58. The first wheel 56 is a first angled gearwheel which is fixed to the coupling part 50. The second wheel 58 is a second angled gearwheel which is fixed to the second frame 8. Note that a rotation of the first frame 4 around the first axis 12 may affect the rotation of the second frame 8 around the second axis 14. However, a similar rotation of the coupling part 50 may cancel out that effect. Thus, individual control of the rotation of the second frame 8 around the second axis 14 is provided by the second drive 18.

However, knowledge of the rotation of the first frame 4 around the first axis 12 may be an advantage.

Thus, by controlling the first drive 16 and the second drive 18, an optical path may be set in a desired direction and/or a desired scanning motion may be carried out.

In an embodiment (not illustrated), a part of the second drive 18 is fixed to the first frame 4. Thus, the rotation of the first frame 4 around the first axis 12 may not influence the rotation of the second frame 8 around the second axis 14. Thus, individual control of the rotation of the second frame 8 around the second axis 14 is provided by the second drive 18.

Note that an aim (focus point) of the optical path 60 may correspond to more than one setting of the angular positions of the first frame 4 around the first axis 12 and the second frame 8 around the second axis 14, respectively. Thus, it may be an advantage to coordinate the rotational position of the first frame 4 and the second frame 8, respectively. Preferably, the coordination is carried out by a control device (see FIG. 6).

Figure 6:
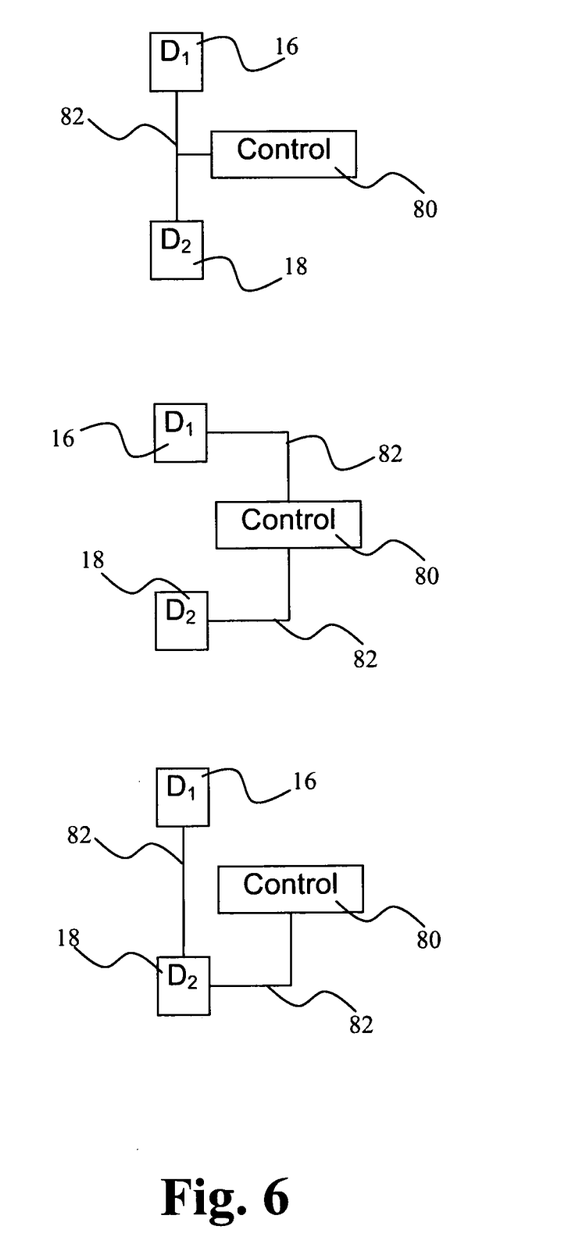

FIG. 6 schematically illustrates three embodiments showing a control device 80 connected to a first drive 16 and a second drive 18 respectively, of a device, e.g. 2, 102, 202, according to the present invention. In some embodiments of a device, e.g. 2, 102, 202, the rotation of the first frame 4 around the first axis 12 may influence the rotation of the second frame 8 around the second axis 14. Thus, it may be an advantage that one control device 80 controls both the first drive 16 and the second drive 18. Furthermore, since a single aim (focus) of an optical path may correspond to more than one combination of rotational positions of the first frame and the second frame, it may be an advantage that one control device 80 controls both the first drive 16 and the second drive 18. The control connection 82 may be adapted for digital control.

Figure 7:
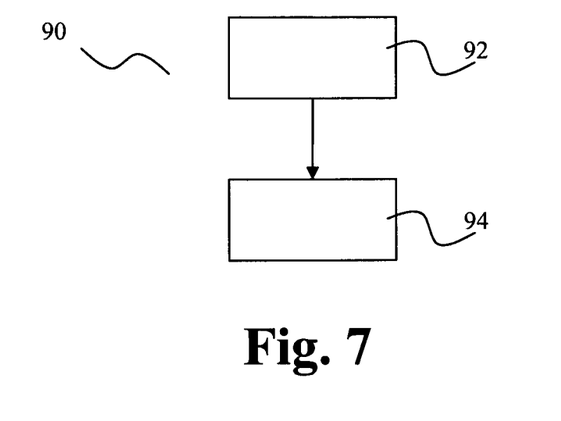

FIG. 7 schematically illustrates an embodiment of a method 90 for scanning according to the present invention. The method 90 comprises providing a scanning device (not shown in FIG. 7) comprising a first frame supporting a first deflector, the first frame being arranged for rotation around a first axis. The scanning device furthermore comprises a second frame supporting a second deflector, the second frame being arranged for rotation around a second axis. The second axis forms a frame angle with the first axis. The method for scanning comprises a number of steps or events. A step or an event may refer to at least a part of a process to be carried out and is not necessarily restricted to a step or an event to be carried out isolated from other steps or events. Preferably, the scanning device provided in the method for scanning is a scanning device according to the present invention. A first step 92 comprises selection of a first value and/or a second value. A selected value may be an angle value (angular position) and/or an angular velocity and/or an angular acceleration. A second step 94 comprises rotating the first frame around the first axis according to the selected first value and/or rotating the second frame around the second axis according to the selected second value. The first value and the second value may be chosen such that at least one of the first frame and the second frame are rotated around their respective axis.

The invention claimed is:

1. A scanning device comprising
a first frame supporting a first deflector for deflecting light, the first deflector having a first surface and a second surface, the first surface and the second surface forming a first deflector angle, the first frame being arranged for rotation around a first axis, the first axis forming a first surface angle with the first surface, and
a second frame supporting a second deflector for deflecting light, the second deflector having a third surface and a fourth surface, the third surface and the fourth surface forming a second deflector angle, the second frame being arranged for rotation around a second axis, the second axis forming a frame angle with the first axis, forming a second surface angle with the second surface, and forming a third surface angle with the third surface,
wherein the first frame being rotatably connected to a base for rotation around the first axis and the second frame being arranged for rotation around the first axis, the scanning device further comprising
a first drive coupled to the first frame for controlling the rotation of the first frame around the first axis, and
a second drive coupled to the second frame for controlling the rotation of the second frame around the second axis, such that individual control of the rotation of the first frame around the first axis and the rotation of the second frame around the second axis is provided,
the device being adapted for setting up an optical path, the optical path comprising
a first optical path part extending from the first surface and away from the first deflector, the first optical path part forming a first optical angle with the first surface,
a second optical path part extending between the second surface and the third surface, the second optical path part forming a second optical angle with the second surface and forming a third optical angle with the third surface, respectively, and
a third optical path part extending from the fourth surface and away from the second deflector, the third optical path part forming a fourth optical angle with the fourth surface, wherein
the first optical path part is substantially parallel with the first axis,
the second optical path part is substantially parallel with the second axis,
the first optical angle is substantially equal to the second optical angle, and
the fourth optical angle is substantially equal to the third optical angle.

2. A scanning device according to claim 1, wherein the first optical path part coincides with a part of the first axis and the second optical path part coincides with a part of the second axis.

3. A scanning device according to claim 1, wherein the first surface angle is given by approximately $$90° - \arcsin(n_1 \cdot \sin(\tfrac{\alpha_1}{2})),$$

where
$n_1$ is the refractive index of the first deflector, and
$a_1$ is the first deflector angle.

4. A scanning device according to claim 1, wherein the frame angle is between about 1° to about 60°, such as between about 20° to about 40°, preferably about 31°.

5. A scanning device according to claim 1, wherein the frame angle is less than 42°, such as less than 40°, such as less than 35°.

6. A scanning device according to claim 1, wherein the frame angle is larger than 5°, such as larger than 10°, such as larger than 15°.

7. A scanning device according to claim 1, further comprising a control device connected to the first drive and the second drive via at least one control connection, whereby the control device is arranged for controlling the first drive and the second drive, individually.

8. A scanning system comprising a scanning device according to claim 1 and at least one optical device.

9. A scanning system according to claim 8, wherein the at least one optical device comprises a light detector adapted to detect light from the first surface.

10. A scanning system according to claim 8, wherein the at least one optical device comprises a light source, such as a laser, adapted to emit a light beam towards the first surface.

11. A scanning system according to claim 10, wherein the at least one optical device comprises a focusing element.

12. A scanning system according to claim 10, wherein the light beam emitted from the optical device is a finite focused laser beam.

13. A method for scanning with a scanning device according to claim 1,
the method for scanning comprising
selecting a first value,
rotating the first frame around the first axis according to the first value,
selecting a second value, and
rotating the second frame around the second axis according to the second value.

14. A method according to claim 13, the method comprising
rotating the first frame around the first axis with a first speed of rotation, and
rotating the second frame around the second axis with a second speed of rotation,
wherein the first speed of rotation is different from the second speed of rotation, and
wherein the first speed of rotation is at least 1% higher or lower than the second speed of rotation.

15. A method for scanning according to claim 13, wherein the scanning device is a scanning system according to claim 8.

16. A scanning system according to claim 9, wherein the at least one optical device comprises a light source, such as a laser, adapted to emit a light beam towards the first surface.

17. A scanning system according to claim 16, wherein the at least one optical device comprises a focusing element.

18. A scanning system according to claim 11, wherein the light beam emitted from the optical device is a finite focused laser beam.

19. A method according to claim 15, wherein the scanning system according to claim 8 is a scanning system according to claim 16, the method comprising
illuminating an area in front of the scanning system with the light beam from the light source such that at least a part of the light is reflected from the area, and
detecting at least a part of the reflected light from the area using the light detector.

20. A method according to claim 19, the method comprising measuring or estimating wind speed, velocity of wind, wind direction, or any combination thereof.

* * * * *